(12) United States Patent
Ochi et al.

(10) Patent No.: US 7,206,615 B2
(45) Date of Patent: Apr. 17, 2007

(54) VEHICLE COMMUNICATION SYSTEM

(75) Inventors: Masaaki Ochi, Hirakata (JP); Hiroshi Deguchi, Kawachinagano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 210 days.

(21) Appl. No.: 11/016,927

(22) Filed: Dec. 21, 2004

(65) Prior Publication Data

US 2005/0143141 A1   Jun. 30, 2005

(30) Foreign Application Priority Data

Dec. 26, 2003  (JP)  ............................. 2003-433146

(51) Int. Cl.
*H04M 1/00*   (2006.01)
*H04Q 7/20*   (2006.01)
*H04B 7/00*   (2006.01)

(52) U.S. Cl. .............................. 455/569.2; 455/575.9; 455/41.2; 455/456.1; 455/456.2; 455/550.1

(58) Field of Classification Search ..............................
340/539.22–539.23, 825.69, 825.72, 539.1, 340/539.11, 426.1, 426.16, 10.4, 10.41, 5.6–5.61, 340/5.2, 5.33, 10.1–10.2, 173–176, 539.32, 340/5.72, 426.13, 426.14, 426.15, 853.2, 340/989–994; 341/173–176; 307/10.1–10.3; 455/456.1–456.6, 3.05–3.06, 404.2, 3.03, 455/41.1–41.3, 67.11, 67.12, 550.1, 423–425, 455/99, 421, 569.2, 575.9, 95–96, 101, 103, 455/123–124, 414.2, 73, 88, 91–92, 345, 455/152.1, 68, 418–420, 352; 701/19–20, 701/2, 36, 49, 51, 53–54, 214, 300
See application file for complete search history.

(56) References Cited

U.S. PATENT DOCUMENTS

| | | | | |
|---|---|---|---|---|
| 4,232,390 A * | 11/1980 | McEvilly, Jr. | ............... | 455/77 |
| 4,533,871 A * | 8/1985 | Boetzkes | .................... | 324/207 |
| 6,204,813 B1 * | 3/2001 | Wadell et al. | .............. | 342/463 |
| 2002/0105411 A1 * | 8/2002 | Maeda et al. | .............. | 340/5.64 |
| 2003/0066702 A1 * | 4/2003 | Jung et al. | .................. | 180/271 |
| 2003/0222758 A1 * | 12/2003 | Willats et al. | ............. | 340/5.72 |

FOREIGN PATENT DOCUMENTS

JP       11-101033       4/1999

* cited by examiner

*Primary Examiner*—Charles Appiah
*Assistant Examiner*—Meless Zewdu
(74) *Attorney, Agent, or Firm*—Wenderoth, Lind & Ponack, L.L.P.

(57) ABSTRACT

A first transmitter outputs a request signal requesting a response to a mobile device toward an area including a driver's seat and its neighborhood, and a second transmitter outputs a request signal toward an area covering the entire vehicle. The mobile device transmits a response signal to a receiver if receiving the request signal transmitted from the first or second transmitter. The controller detects the position of the mobile device based on a communication result between the mobile device and the receiver in response to the request signals transmitted from the first and second transmitters.

10 Claims, 10 Drawing Sheets

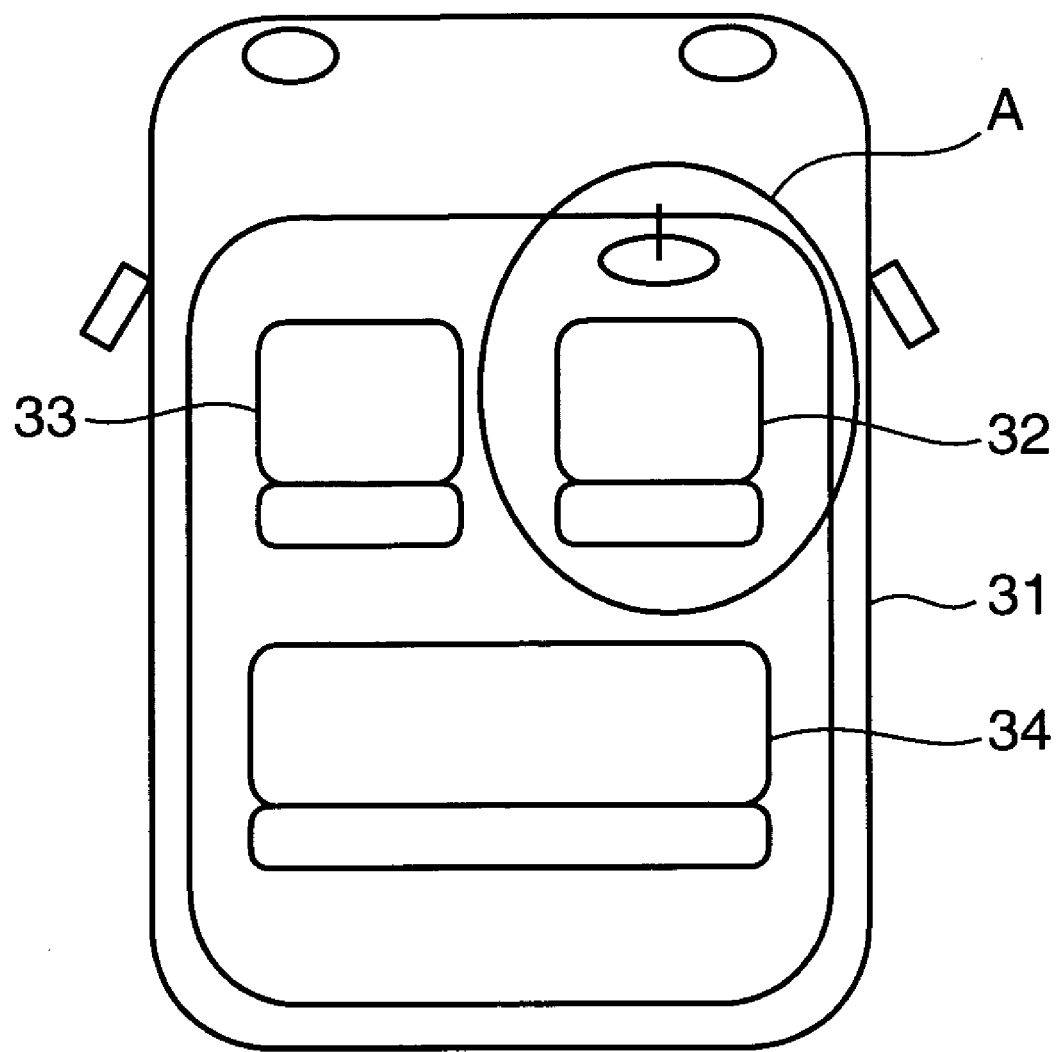

VEHICLE COMMUNICATION SYSTEM

BACKGROUND OF THE INVENTION

1. Field of the Invention

The present invention relates to a vehicle communication system for conducting a communication between a transceiver installed in the vehicle and a mobile device to control the start of a vehicle engine and locking and unlocking of vehicle doors based on a communication result.

2. Description of Background Technology

In recent years, vehicles installed with a vehicle communication system for controlling the start of an engine and locking and unlocking of vehicle doors using a mobile device have been on the increase. Such a vehicle communication system is described with reference to FIGS. 9 and 10.

FIG. 9 is a block diagram showing a construction of a prior art vehicle communication system. The vehicle communication system shown in FIG. 9 is provided with a transceiver 10 and a mobile device 20, wherein the transceiver 10 includes a controller 21, a transmitter 22 and a receiver 23. The transceiver 10 is connected with a start detector 40 and a notifying device 50.

The start detector 40 is disposed at a specified position in the vehicle to detect that an operation button (not shown) for starting an engine has been pressed. The transmitter 22 includes an oscillating circuit and an antenna, and is disposed at a specified position in a passenger compartment. The transmitter 22 transmits a request signal requesting an authentication signal when the start detector 40 detects that the operation button has been pressed.

The mobile device 20 is card-shaped and transmits the authentication code signal upon receiving the request signal from the transmitter 22. The receiver 23 is disposed at a specified position in the vehicle to receive the authentication code signal. The notifying device 50 is disposed at a specified position in the passenger compartment to notify information representing whether or not the receiver 23 has received the authentication code signal from the mobile device 20. The controller 21 is disposed at a specified position of the vehicle and connected with the start detector 40, the notifying device 50, the transmitter 22 and the receiver 23 to control operations of the respective devices.

FIG. 10 is a diagram showing a communication area of the request signal from the transmitter shown in FIG. 9. An area A shown in FIG. 10 is the communication area of the transmitter 22 and covers a driver's seat 32 and its neighborhood in the passenger compartment of a vehicle 31, but covers neither a front passenger seat 33 nor a rear passenger seat 34.

In the above construction, when a driver presses the operation button to start the engine, this is detected by the start detector 40 and the controller 21 detects the detection by the start detector 40, whereupon the request signal requesting the authentication code signal is transmitted from the transmitter 22.

Thereafter, the controller 21 confirms a received content of the receiver 23. In the case of receiving the correct authentication code signal from the mobile device 20, the controller 21 judges that the mobile device 20 is located in the communication area A of the transmitter 22 (at and near the driver's seat), i.e. the driver is carrying the mobile device 20, a short beeping sound representing a content of the judgment is, for example, outputted from the notifying device 50, and the engine is started.

On the other hand, if no correct authentication code signal or no signal has been received from the mobile device 20, the controller 21 judges that the mobile device 20 is not located in the communication area A of the transmitter 22, i.e. the driver is not carrying the mobile device 20, causes the notifying device 50 to output several consecutive beeping sounds representing a content of the judgment, and executes such a control as not to start the engine.

A vehicle electronic key system disclosed in Japanese Unexamined Patent Publication No. H11-101033 is known as another prior art vehicle communication system. This vehicle electronic key system transmits a request signal to the inside and/or outside of a vehicle and controls devices installed in the vehicle in accordance with a response from a mobile device. If there is no response to the request signal from the mobile device, this key system increases the intensity of the request signal being transmitted and detects the presence or absence of any passenger in a passenger compartment. The key system transmits the request signal to the inside of the passenger compartment if there is any passenger in the passenger compartment while transmitting the request signal to the outside of the passenger compartment if there is no passenger in the passenger compartment.

However, in the former vehicle communication system, if the driver presses the operation button when the mobile device 20 is placed in an area outside the communication area A of the transmitter 22 (area outside the driver's seat and its neighborhood), the controller 21 causes the transmitter 22 to transmit the request signal requesting the authentication code signal, but this request signal does not reach the mobile device 20. Since the controller 21 cannot confirm the authentication code signal from the mobile device 20, the engine is not started. At this time, the driver can understand that the engine is not started because the mobile device 20 is not located at or near the driver's seat, but has no idea as to where the mobile device 20 can be. This holds for the above vehicle electronic key system, which has a similar problem accordingly.

SUMMARY OF THE INVENTION

An object of the present invention is to provide a vehicle communication system capable of notifying information as to where a mobile device is located to a driver and/or a passenger even if the mobile device is not located at or near a driver's seat.

A vehicle communication system according to one aspect of the present invention is provided with a transceiver disposed in a vehicle and a mobile device for transmitting and receiving specified signals to and from the vehicle equipped with the transceiver, wherein the transceiver includes a first transmitting means for outputting a request signal requesting a response to the mobile device toward a first communication area, a second transmitting means for outputting the request signal toward a second communication area different from the first communication area, a receiving means for receiving a response signal transmitted from the mobile device in response to the request signal, and a control means for controlling operations of the first transmitting means, the second transmitting means and the receiving means. The mobile device transmits the response signal to the receiving means in the case of receiving the request signal transmitted from the first or second transmitting means; and the control means detects the position of the mobile device based on a communication result between the mobile device and the receiving means in response to the request signals transmitted from the first and second transmitting means.

In this vehicle communication system, whether the mobile device is located in the first communication area, in the second communication area excluding the first communication area or outside the first and second communication areas can be detected based on the communication result between the mobile device and the receiving means in response to the request signals transmitted from the first and second transmitting means. Thus, information as to where the mobile device is located can be notified to a driver and/or a passenger by means of a notifying device or the like.

These and other objects, features and advantages of the present invention will become more apparent upon a reading of the following detailed description and accompanying drawings.

BRIEF DESCRIPTION OF THE DRAWINGS

FIG. 10 is a diagram showing a communication area of a request signal transmitted from a transmitter shown in FIG. 9.

DESCRIPTION OF PREFERRED EMBODIMENTS OF THE INVENTION

Figure 1:
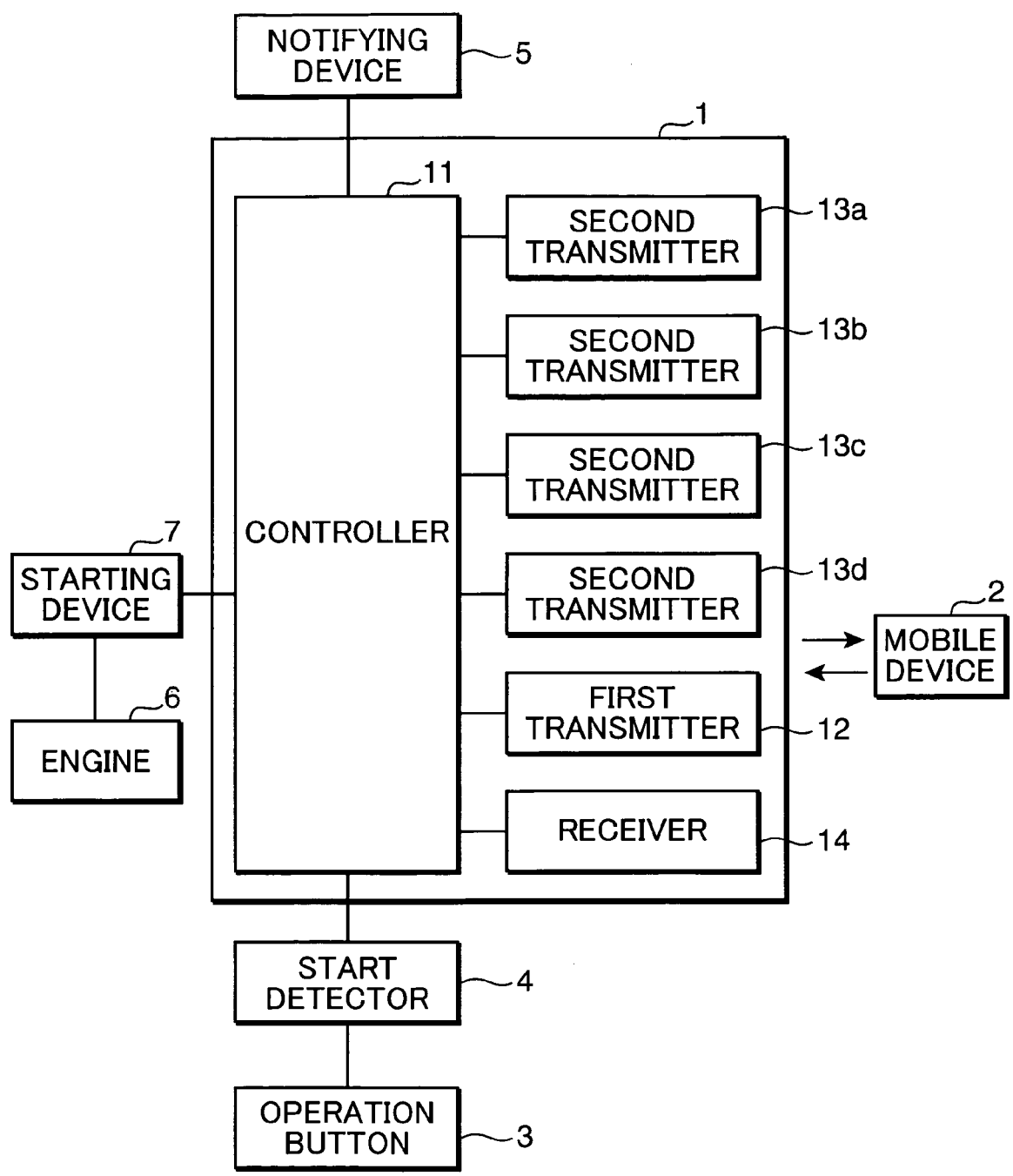
FIG. 1 is a block diagram showing a construction of a vehicle communication system according to a first embodiment of the invention.

Hereinafter, vehicle communication systems according to embodiments of the invention are described with reference to the accompanying drawings. FIG. 1 is a block diagram showing a construction of a vehicle communication system according to a first embodiment of the present invention.

The vehicle communication system shown in FIG. 1 is provided with a transceiver 1 and a mobile device 2, wherein the transceiver 1 includes a controller 11, a first transmitter 12, four second transmitters 13a to 13d and a receiver 14. The transceiver 1 is connected with a start detector 4, a notifying device 5 and a starting device 7.

The start detector 4 includes a switch, an IC and the like, and is deposed at a specified position in a vehicle to detect that an operation button 3 for starting an engine 6 has been pressed by a driver (engine starting action). The starting device 7 includes a cell motor and the like for starting the engine 6. The start detector 4 is not particularly limited to the construction for detecting the engine starting action through the pressing of the operation button 3 and, instead, may take such a construction as to detect the pressing, rotation or the like of a knob.

The first transmitter 12 includes an oscillating circuit and an antenna and is disposed at a specified position in a passenger compartment, for example, below or above a driver's seat. The first transmitter 12 is so controlled by the controller 11 as to transmit a request signal requesting an authentication code signal when the start detector 4 detects the pressing of the operation button 3.

Figure 2:
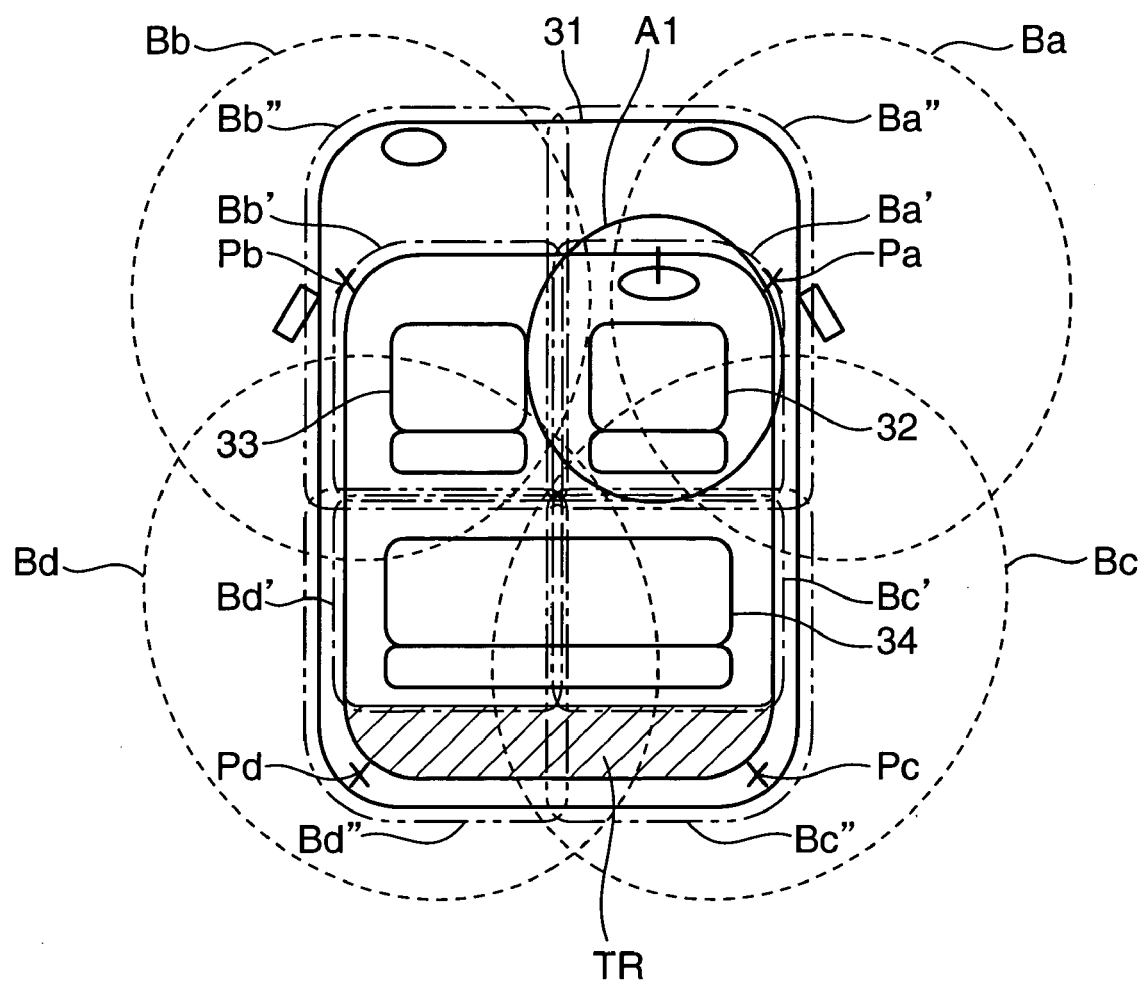
FIG. 2 is a diagram showing an example of communication areas of request signals transmitted from a first transmitter and second transmitters shown in FIG. 1.

FIG. 2 is a diagram showing an example of communication areas of request signals transmitted from the first and second transmitters shown in FIG. 1. An area A1 shown by solid line in FIG. 2 is a communication area of the request signal from the first transmitter 12 and covers the driver's seat 32 and its neighborhood, but covers neither a front passenger seat 33 nor a rear passenger seat 34 in the passenger compartment of a vehicle 31. It should be noted that a communication area A1 is set within the above range by suitably adjusting the transmission intensity, the directivity and the like of a transmitting antenna of the first transmitter 12 or suitably adjusting the radio wave absorbing characteristic, the radio wave reflecting characteristic and the like of the respective members in the passenger compartment and in the vehicle. This also holds for the other communication areas.

Referring back to FIG. 1, each second transmitter 13a to 13d includes an oscillating circuit and an antenna and is disposed at a specified position of the vehicle. For example, the second transmitter 13a is disposed at a front right side of the vehicle: the second transmitter 13b at a front left side of the vehicle; the second transmitter 13c at a rear right side of the vehicle; and the second transmitter 13d at a rear left side of the vehicle. More specifically, the second transmitters 13a to 13d are disposed at a total of four positions: at fixing positions for mounting mirrors near the left and right doors of the vehicle (points Pa, Pb shown in FIG. 2) and at the left and right sides in a rear bumper (points Pc, Pd shown in FIG. 2). Similar to the first transmitter 12, the second transmitters 13a to 13d are so controlled by the controller 11 as to transmit the request signals requesting the authentication code signal.

Referring back to FIG. 2, an area Ba shown by broken line in FIG. 2 is a communication area of the request signal of the second transmitter 13a and covers a front right area of the vehicle 31 including a part of the driver's seat 32 in the passenger compartment. An area Bb is a communication area of the request signal of the second transmitter 13b and covers a front left area of the vehicle 31 including the front passenger seat 33 and its neighborhood in the passenger compartment. An area Bc is a communication area of the request signal of the second transmitter 13c and covers a rear right side of the vehicle 31 including the right side of the rear passenger seat 34 and its neighborhood in the passenger compartment. An area Bd is a communication area of the request signal of the second transmitter 13d and covers a rear left side of the vehicle 31 including the left side of the rear passenger seat 34 and its neighborhood in the passenger compartment. Accordingly, the entire area in the passenger compartment is covered by the communication area A1 and parts of the communication areas Ba to Bd covering the passenger compartment, and the remaining parts of the communication areas Ba to Bd cover the vicinity of the vehicle.

Referring back to FIG. 1 again, the mobile device 2 is a card-shaped device comprised of a microcomputer and an antenna. The mobile device 2 includes a storage, a receiver and a transmitter inside, and transmits the authentication code signal saved beforehand as a response signal upon receiving the request signal from the first transmitter 12 or the second transmitter 13a to 13d.

The receiver 14 includes a resonant circuit and an antenna, and is disposed at a specified position of the vehicle to receive the authentication code signal transmitted from the mobile device 2.

The notifying device 5 is disposed in or near an instrument panel for displaying a vehicle speed, a remaining amount of gasoline, etc. and outputs information representing the position of the mobile device 2 to the driver or other passenger using an image and/or a sound based on whether or not the receiver 14 has received the authentication code signal from the mobile device 2. It should be noted that the notifying device is not particularly limited to the above example, and such information may be output to the driver and/or the passenger using another method such as blinking of a lamp in the passenger compartment.

The controller 11 includes a microcomputer and is disposed at a specified position of the vehicle. The controller 11 is connected with the start detector 4, the notifying device 5, the starting device 7, the first transmitter 12, the second transmitters 13a to 13d and the receiver 14 to control operations of the respective devices.

By the above construction, when the driver presses the operation button 3 for starting the engine 6, the start detector 4 detects this engine starting action and outputs a detection result to the controller 11. The controller 11 detects the detection of the engine starting action by the start detector 4 and causes the first transmitter 12 to transmit the request signal requesting the authentication code signal.

Thereafter, the controller 11 confirms a received content of the receiver 14, and judges that the receiver 14 has received the authentication code signal from the mobile device 2 if an authentication code carried by the response signal received by the receiver 14 agrees with an authentication code signal saved in the controller 11 beforehand. If the receiver 14 has received the authentication code signal from the mobile device 2, the controller 11 judges that the mobile device 2 is located in the communication area A1 (driver's seat 32 and its neighborhood) of the first transmitter 12 and the driver is carrying the mobile device 2. In such a case, the controller 11 causes the notifying device 5 output information representing that the driver is carrying the mobile device 2 and causes the starting device 7 to start the engine 6. The notifying device 5 notifies the driver and/or the passenger to this information, for example, by outputting a short beeping sound indicating this information.

On the other hand, if the receiver 14 has received no correct authentication code signal from the mobile device 2, the controller 11 causes the second transmitters 13a to 13d to transmit the request signals. Thereafter, if the mobile device 2 transmits the authentication code signal in response to the request signals from the second transmitters 13a to 13d and the receiver 14 receives the authentication code signal, the controller 11 judges that the mobile device 2 is located in an area defined by the communication areas Ba to Bd of the second transmitters 13a to 13d excluding the communication area A1 of the first transmitter 12.

In such a case, the controller 11 causes the notifying device 5 to output information representing that the mobile device 2 is located in the area defined by the communication areas Ba to Bd of the second transmitters 13a to 13d excluding the communication area A1 of the first transmitter 12 and controls the starting device 7 not to start the engine 6. The notifying device 5 notifies the driver and/or the passenger, for example to this information, by outputting a few consecutive beeping sounds indicating this information.

Accordingly, even if the driver unconsciously leaves the mobile device 2 in an area outside the driver's seat and its neighborhood, there is no likelihood that the driver has no idea as to where the mobile device 2 is located. The driver is made aware that the mobile device 2 is located in the area defined by the communication areas Ba to Bd of the second transmitters 13a to 13d excluding the communication area A1 of the first transmitter 12, i.e. in the passenger compartment excluding the driver's seat and its neighborhood or around the vehicle. Therefore, the mobile device 2 can be easily found.

If the mobile device 2 could not receive the request signals from the second transmitters 13a to 13d and the receiver 14 did not receive the authentication code signal from the mobile device 2, the controller 11 judges that the mobile device 2 is located neither in the communication area A1 of the first transmitter 12 nor in the communication areas Ba to Bd of the second transmitters 13a to 13d.

In such a case, the controller 11 causes the notifying device 5 to output information representing that the mobile device 2 is located neither in the passenger compartment nor around the vehicle and controls the starting device 7 not to start the engine 6 since the communication area A1 of the first transmitter 12 and the communication areas Ba to Bd of the second transmitters 13a to 13d cover the entire area in the passenger compartment and an area around the vehicle. The notifying device 5 notifies the driver and/or the passenger to this information, for example, by outputting several consecutive beeping sounds indicating this information.

Accordingly, even if the driver unconsciously leaves the mobile device 2 outside the passenger compartment and the area around the vehicle and the engine 6 is not started when the operation button 3 is pressed, there is no likelihood that the driver has no idea as to whether the mobile device 2 is located. The driver is made aware that the mobile device 2 is located in an area outside the communication area A1 of the first transmitter 12 and the communication areas Ba to Bd of the second transmitters 13a to 13d, i.e. outside the passenger compartment and the area around the vehicle. Therefore, the mobile device 2 can be easily found.

As described above, the vehicle communication system of this embodiment is provided with the first transmitter 12 for outputting the request signal requesting a response to the mobile device 2 for transmitting and receiving the specific signals to and from the vehicle having the transceiver 1 installed therein toward the driver's seat and its neighborhood, the second transmitters 13a to 13d for outputting the request signals toward the four communication areas Ba to Bd different from the communication area A1 of the first transmitter 12, the receiver 14 for receiving the response signal from the mobile device 2, and the controller 11 connected with the first transmitter 12, the second transmitters 13a to 13d and the receiver 14. Based on the communication result between the mobile device 2 and the receiver 14 in response to the request signals transmitted from the first transmitter 12 and the second transmitters 13a to 13d, can be detected whether the mobile device 2 is located at or near the driver's seat, in the passenger compartment excluding the driver's seat and its neighborhood, around the vehicle or in the area outside these areas. As a result, such information can be notified to the driver and/or the passenger by the notifying device 5.

Further, since the communication area A1 of the first transmitter 12 and the communication areas Ba to Bd of the second transmitters 13a to 13d cover the entire area in the passenger compartment, the controller 11 may detect the information as to whether the mobile device 2 is located at or near the driver's seat, in the passenger compartment excluding the driver's seat and its neighborhood, or in the area outside these areas based on the communication result between the mobile device 2 and the receiver 14 in response to the request signals transmitted from the first transmitter 12 and the second transmitters 13a to 13d. In such a case, such information can be output to the driver and/or the passenger by the notifying device 5.

An example of covering the entire area in the passenger compartment by the communication area A1 of the first transmitter 12 and the communication areas Ba to Bd of the second transmitters 13a to 13d is not particularly limited to the above example. For example, the second transmitters 13a to 13d may transmit the request signals toward communication areas Ba', Bb', Bc', Bd' shown by chain line in FIG. 2. In such a case, the area Ba' covers a right upper area in the passenger compartment including a part of the driver's seat 32; the area Bb' covers a left upper area in the passenger compartment including the front passenger seat 33 and its neighborhood; the area Bc' covers a right lower area in the passenger compartment including the right side of the rear passenger seat 34 and its neighborhood; and the area Bd' covers a left lower area in the passenger compartment including the left side of the rear passenger seat 34 and its neighborhood. Since the communication areas Ba', Bb', Bc', Bd' cover almost only the interior of the passenger compartment, whether the mobile device 2 is located at or near the driver's seat, in the passenger compartment excluding the driver's seat and its neighborhood, or in an area outside these areas can be more precisely detected, and such information can be output to the driver and/or the passenger.

Further, since the communication area A1 of the first transmitter 12 and the communication areas Ba to Bd of the second transmitters 13a to 13d cover the entire area within the vehicle, the controller 11 may detect the information as to whether the mobile device 2 is located at or near the driver's seat, within the vehicle excluding the driver's seat and its neighborhood, or in the area outside these areas based on the communication result between the mobile device 2 and the receiver 14 in response to the request signals transmitted from the first transmitter 12 and the second transmitters 13a to 13d. In such a case, such information can be output to the driver and/or the passenger by the notifying device 5.

An example of covering the entire area within the vehicle by the communication area A1 of the first transmitter 12 and the communication areas Ba to Bd of the second transmitters 13a to 13d is not particularly limited to the above examples. For example, the second transmitters 13a to 13d may transmit the request signals toward communication areas Ba", Bb", Bc", Bd" shown by chain double-dashed line in FIG. 2. In such a case, the area Ba" covers a right upper area within the vehicle including a part of the driver's seat 32; the area Bb" covers a left upper area within the vehicle including the front passenger seat 33 and its neighborhood; the area Bc" covers a right lower area within the vehicle including the right side of the rear passenger seat 34 and its neighborhood; and the area Bd" covers a left lower area within the vehicle including the left side of the rear passenger seat 34 and its neighborhood. Since the communication areas Ba", Bb", Bc", Bd" cover almost only the interior of the vehicle, whether the mobile device 2 is located at or near the driver's seat, within the vehicle excluding the driver's seat and its neighborhood, or in an area outside these areas can be more precisely detected, and such information can be output to the driver and/or the passenger.

Further, the transmission timing of the request signals of the second transmitters 13a to 13d is not particularly limited to the above examples, and various changes can be made. For example, instead of simultaneously transmitting the request signals 13a to 13d from the four positions, the request signals may be successively transmitted with delays from the second transmitters 13a to 13d, and a received content of the receiver 14 may be confirmed at every transmission. In such a case, in which of the communication areas Ba to Bd the mobile device 2 is located can be judged, and a content of judgment can be output to the driver and/or other passenger.

For example, in the case that the second transmitter 13a is caused to transmit only the request signal covering the communication area Ba and then the receiver 14 receives the authentication code signal from the mobile device 2 in response to this request signal, the mobile device 2 is judged to be located in the communication area Ba of the second transmitter 13a excluding the communication area A1 of the first transmitter 12, and information representing that the mobile device 2 is located in the communication area Ba excluding the communication area A1 can be output to the driver and/or the passenger by the notifying device 5.

Further, the numbers and positions of the first and second transmitters are not particularly limited to the above examples, and various changes can be made. For example, a second transmitter (not shown) may be disposed outside the passenger compartment, but in a trunk TR (hatched portion in FIG. 2) of the vehicle, so that a communication area of this second transmitter and the communication area A1 of the first transmitter 12 cover the entire area within the vehicle. In such a case, the controller 11 can detect information representing whether the mobile device 2 is located at or near the driver's seat, within the vehicle excluding the driver's seat and its neighborhood or outside these areas based on a communication result between the mobile device 2 and the receiver 14 in response to the request signals transmitted from the second transmitter and the first transmitter 12. Thus, such information can be output to the driver and/or the passenger by the notifying device 5.

Although the first transmitter 12 transmits the request signal toward the communication area A1 covering only the driver's seat and its neighborhood in the passenger compartment in the above description, the communication area of the first transmitter is not particularly limited to this example. Various changes can be made as described below.

Figure 3:
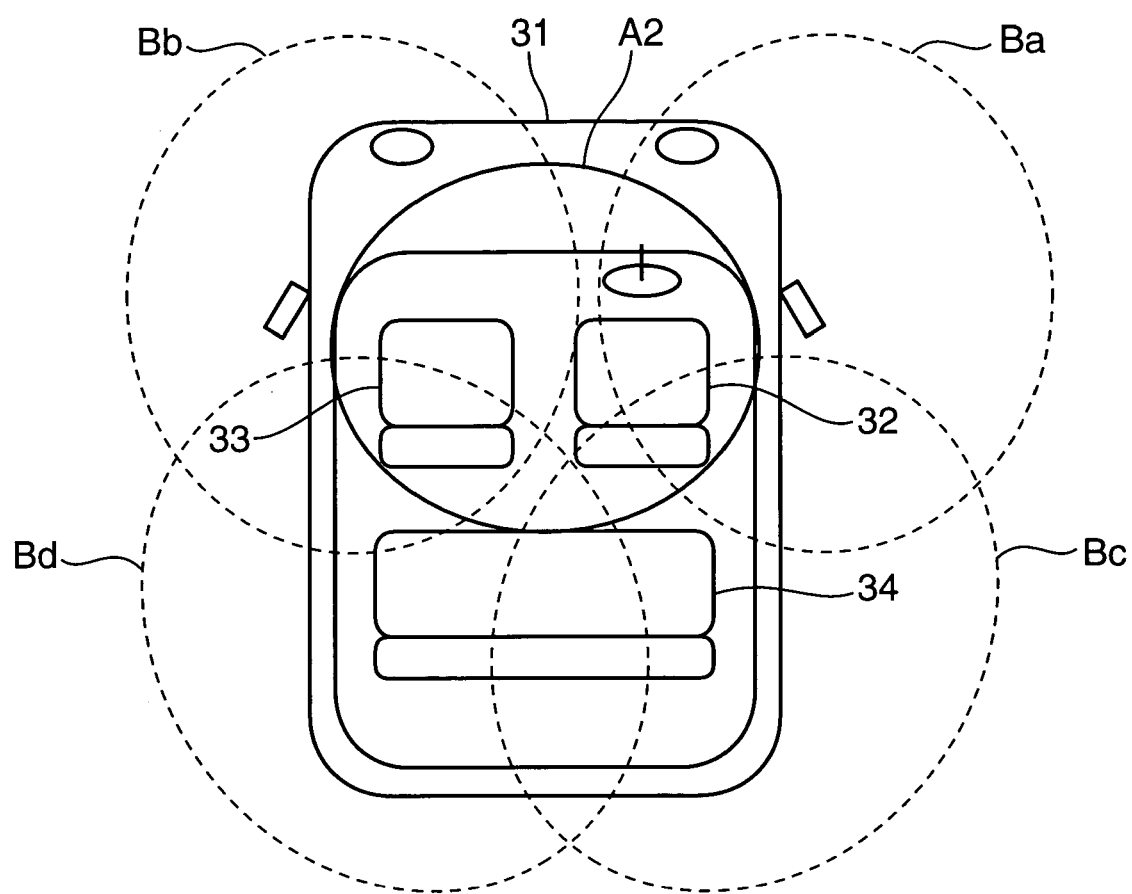
FIG. 3 is a diagram showing another example of the communication area of the request signal transmitted from the first transmitter shown in FIG. 1.

FIG. 3 is a diagram showing another example of the communication area of the request signal transmitted from the first transmitter shown in FIG. 1. As shown in FIG. 3, the first transmitter 12 is disposed below or above a position between the driver's seat 32 and the front passenger seat 33 in the passenger compartment, and transmits the request signal toward a communication area A2 covering the driver's seat 32, the front passenger seat 33 and their neighborhoods. In such a case, the driver can start the engine 6 with the mobile device 2 placed on the front passenger seat 33 or its neighborhood.

Figure 4:
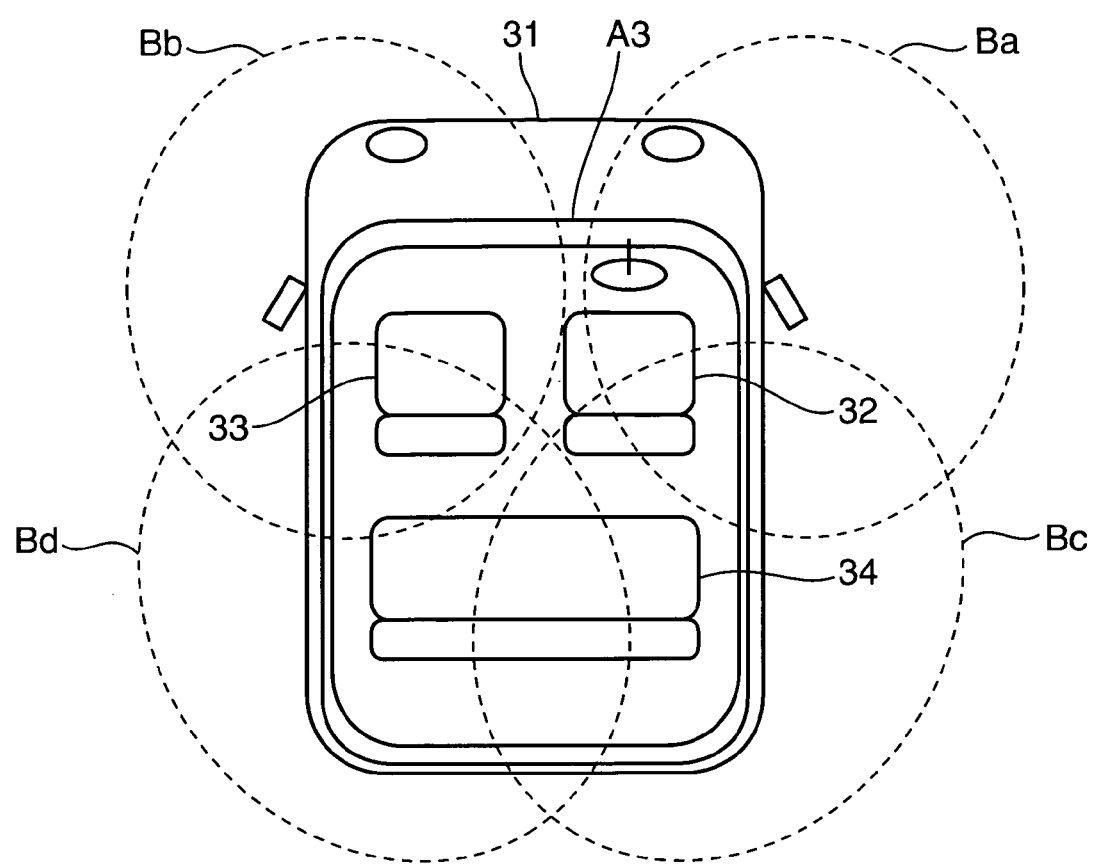
FIG. 4 is a diagram showing still another example of the communication area of the request signal transmitted from the first transmitter shown in FIG. 1.

FIG. 4 is a diagram showing still another example of the communication area of the request signal transmitted from the first transmitter shown in FIG. 1. As shown in FIG. 4, the first transmitter 12 is disposed in a central part of the passenger compartment and transmits the request signal toward a communication area A3 covering the entire area in the passenger compartment. In such a case, the driver can start the engine 6 regardless of in which area the mobile device 2 is placed as long as this area is located within the passenger compartment.

Figure 5:
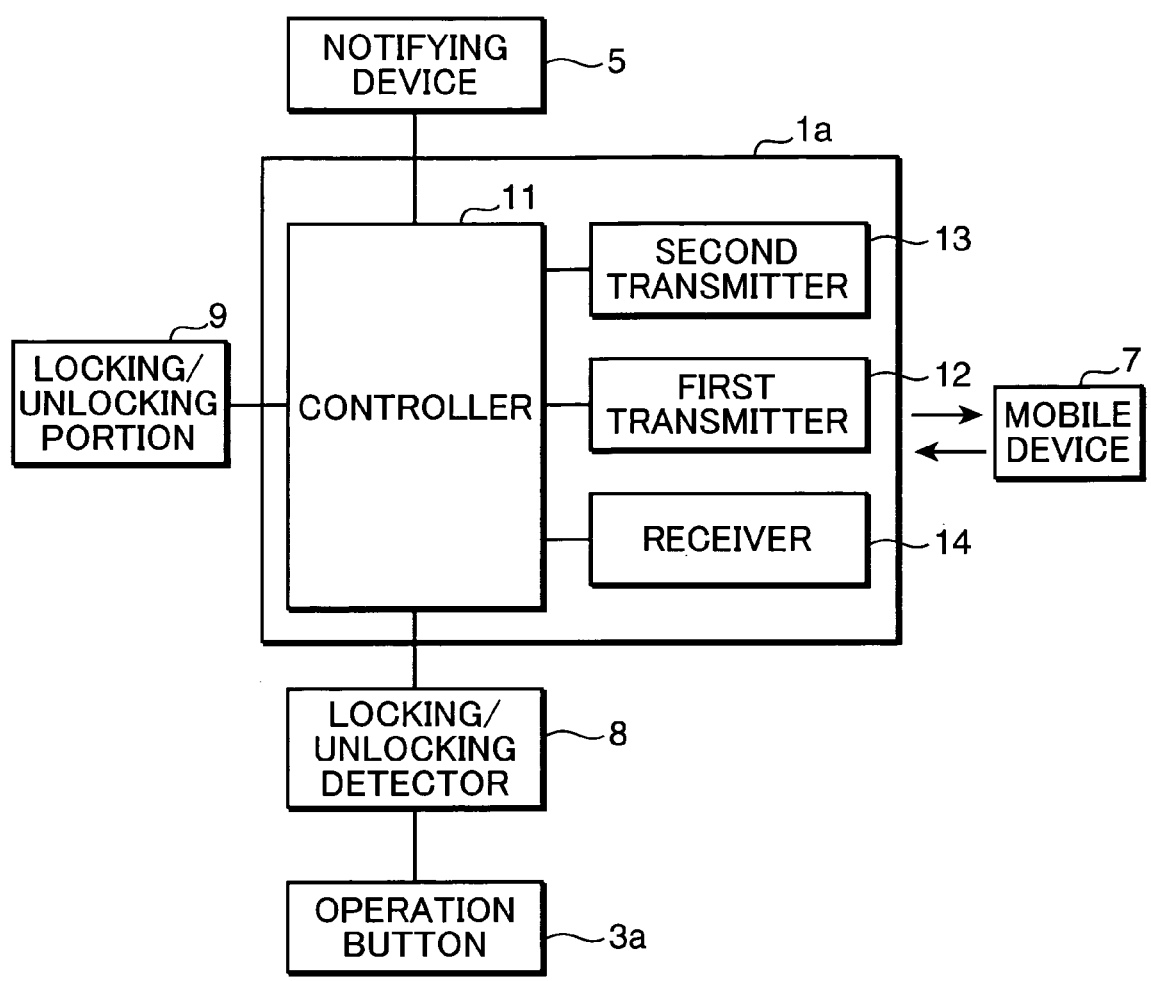
FIG. 5 is a block diagram showing a construction of a vehicle communication system according to a second embodiment of the invention.

FIG. 5 is a block diagram showing a construction of a vehicle communication system according to a second embodiment of the present invention. The vehicle communication system shown in FIG. 5 differs from the one shown in FIG. 1 in that the four second transmitter 13a to 13d are replaced by one second transmitter 13 and a transceiver 1a is connected with a locking/unlocking detector 8 and a locking/unlocking portion 9 instead of being connected with the start detector 4 and the starting device 7. Since the other points are as in the vehicle communication system shown in FIG. 1, only differences are described in detail below by identifying the identical elements by the same reference numerals.

The vehicle communication system shown in FIG. 5 is provided with the transceiver 1a and a mobile device 2, wherein the transceiver 1a includes a controller 11, a first transmitter 12, the second transmitter 13 and a receiver 14. The transceiver 1a is connected with a notifying device 5, the locking/unlocking detector 8 and the locking/unlocking portion 9.

The locking/unlocking detector 8 includes a switch and an IC and is disposed at a specified position in the vehicle. The locking/unlocking detector 8 detects that an operation button 3a for locking or unlocking the vehicle doors has been pressed by a driver. The locking/unlocking portion 9 includes a solenoid and a driving circuit and locks or unlocks the vehicle doors.

The controller 11 controls the first transmitter 12 in such a manner as to transmit a request signal requesting an authentication code signal if the locking/unlocking detector 8 detects the pressing of the operation button 3a. The second transmitter 13 includes an oscillating circuit and an antenna and is disposed in a central part of the vehicle. Similar to the first transmitter 12, the second transmitter 13 is so controlled by the controller 11 as to transmit a request signal requesting the authentication code signal.

Figure 6:
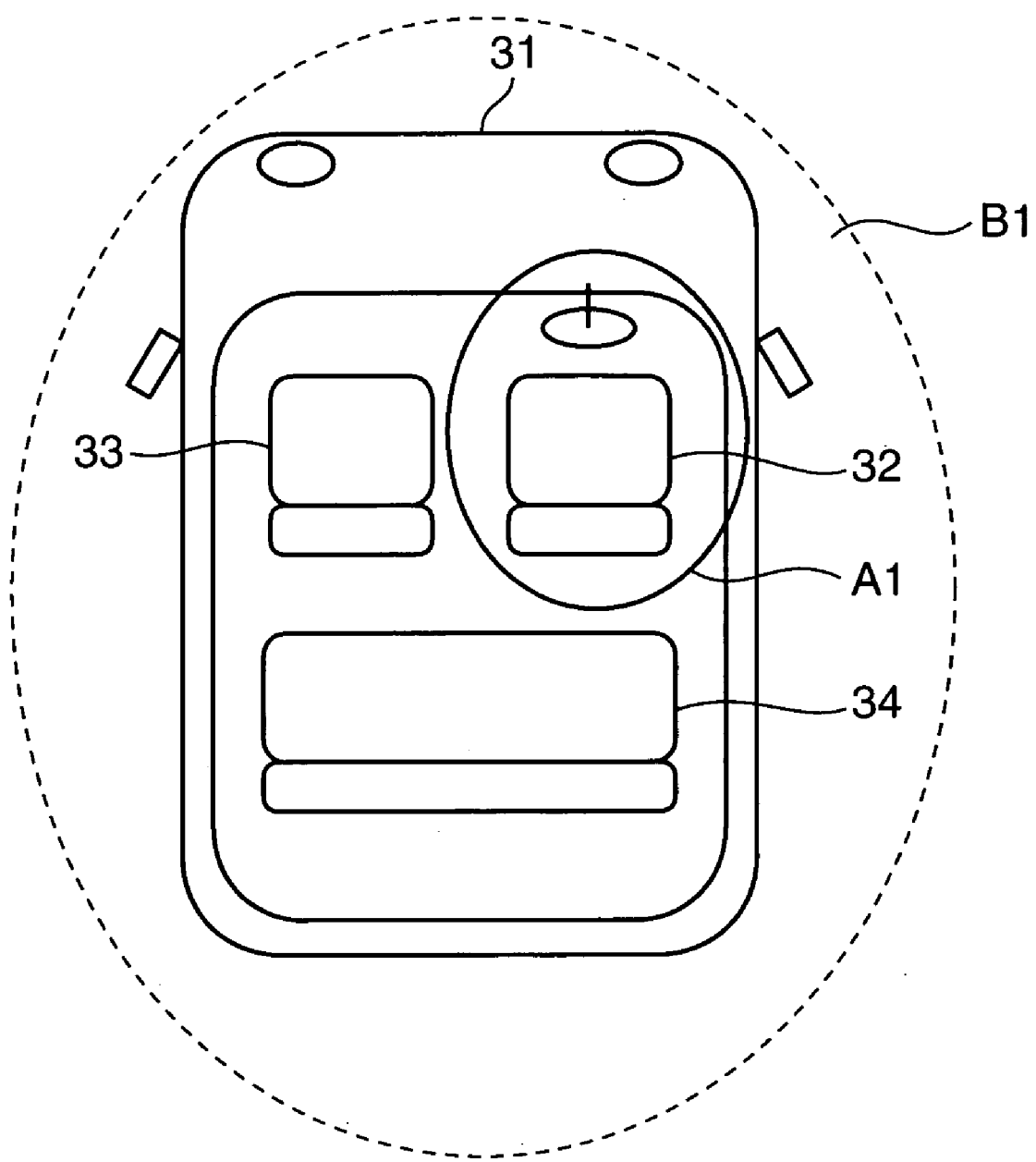
FIG. 6 is a diagram showing an example of communication areas of request signals transmitted from a first and a second transmitters shown in FIG. 5.

FIG. 6 is a diagram showing one example of communication areas of the request signals transmitted from the first and second transmitters 12, 13 shown in FIG. 5. An area B1 shown by broken line in FIG. 6 is a communication area of the request signal from the second transmitter 13, includes a communication area A1 of the request signal from the first transmitter 12 and covers not only the entire area in the passenger compartment, but also an area around the vehicle.

By the above construction, when the driver presses the operation button 3a to lock or unlock the vehicle doors, the locking/unlocking detector 8 detects this locking/unlocking action and outputs a detection result to the controller 11. The controller 11 detects the detection of the locking/unlocking action by the locking/unlocking detector 8, and causes the first transmitter 12 to transmit the request signal requesting the authentication code signal.

Thereafter, the controller 11 confirms a received content of the receiver 14 and judges that the mobile device 2 is located in the communication area A1 (driver's seat 32 and its neighborhood), i.e. the driver is carrying the mobile device 2 if the receiver 14 has received the authentication code signal from the mobile device 2. In such a case, the controller 11 causes the notifying device 5 to output information representing that the driver is carrying the mobile device 2 and also causes the locking/unlocking portion 9 not to lock or unlock the vehicle doors. The notifying device 5 notifies the driver and/or the passenger to this information, for example, by outputting a few consecutive beeping sounds indicating this information.

On the other hand, the controller 11 causes the second transmitter 13 to transmit the request signal if the receiver 14 has received no authentication code signal from the mobile device 2. Thereafter, the controller 11 judges that the mobile device 2 is located in the communication area B1 of the second transmitter 13 excluding the communication area A1 of the first transmitter 12 if the mobile device 2 transmits the authentication code signal in response to the request signal transmitted from the second transmitter 13 and the receiver 14 received the authentication code signal.

In such a case, the controller 11 causes the notifying device 5 to output information representing that the mobile device 2 is located in the communication area B1 of the second transmitter 13 excluding the communication area A1 of the first transmitter 12 and also causes the locking/unlocking portion 9 to lock or unlock the vehicle doors. The notifying device 5 notifies the driver and/or the passenger to this information, for example, by outputting a short beeping sound indicating this information.

Accordingly, even if the driver unconsciously leaves the mobile device 2 at or near the driver's seat and the vehicle doors are not locked or unlocked when the operation button 3a is pressed, there is no likelihood that the driver has no idea as to where the mobile device 2 is located. The driver is made aware that the mobile device 2 is located at or near the driver's seat. Therefore, the mobile device 2 can be easily found.

Further, if the mobile device 2 could not receive the request signal from the second transmitter 13 and the receiver 14 did not receive the authentication code signal from the mobile device 2, the controller 11 judges that the mobile device 2 is located neither in the communication area A1 of the first transmitter 12 nor in the communication area B1 of the second transmitter 13.

In such a case, the controller 11 causes the notifying device 5 to output information representing that the mobile device 2 is located neither in the passenger compartment nor around the vehicle and controls the locking/unlocking portion 9 in such a manner as not to lock or unlock the vehicle doors since the communication area A1 of the first transmitter 12 and the communication area B1 of the second transmitter 13 cover the entire area in the passenger compartment and an area around the vehicle. The notifying device 5 notifies this information to the driver and/or the passenger, for example, by outputting a short beeping sound indicating this information.

Accordingly, even if the driver unconsciously leaves the mobile device 2 outside the passenger compartment and the area around the vehicle and the vehicle doors are not locked or unlocked when the operation button 3 is pressed, there is no likelihood that the driver has no idea as to whether the mobile device 2 is. The driver is made aware that the mobile device 2 is located in an area outside the communication area A1 of the first transmitter 12 and the communication area B1 of the second transmitter 13, i.e. outside the passenger compartment and the area around the vehicle. Therefore, the mobile device 2 can be easily found.

As described above, in this embodiment, despite a simple construction using only one second transmitter 13, the controller 11 can detect pieces of information representing that the mobile device 2 is located at or near the driver's seat, in the area including the passenger compartment excluding the driver's seat and its neighborhood or the area around the vehicle, or outside these areas based on a communication result between the mobile device 2 and the receiver 14 in response to the request signals transmitted from the first and second transmitters 12, 13 and these pieces of information can be output to the driver and/or the passenger.

Figure 7:
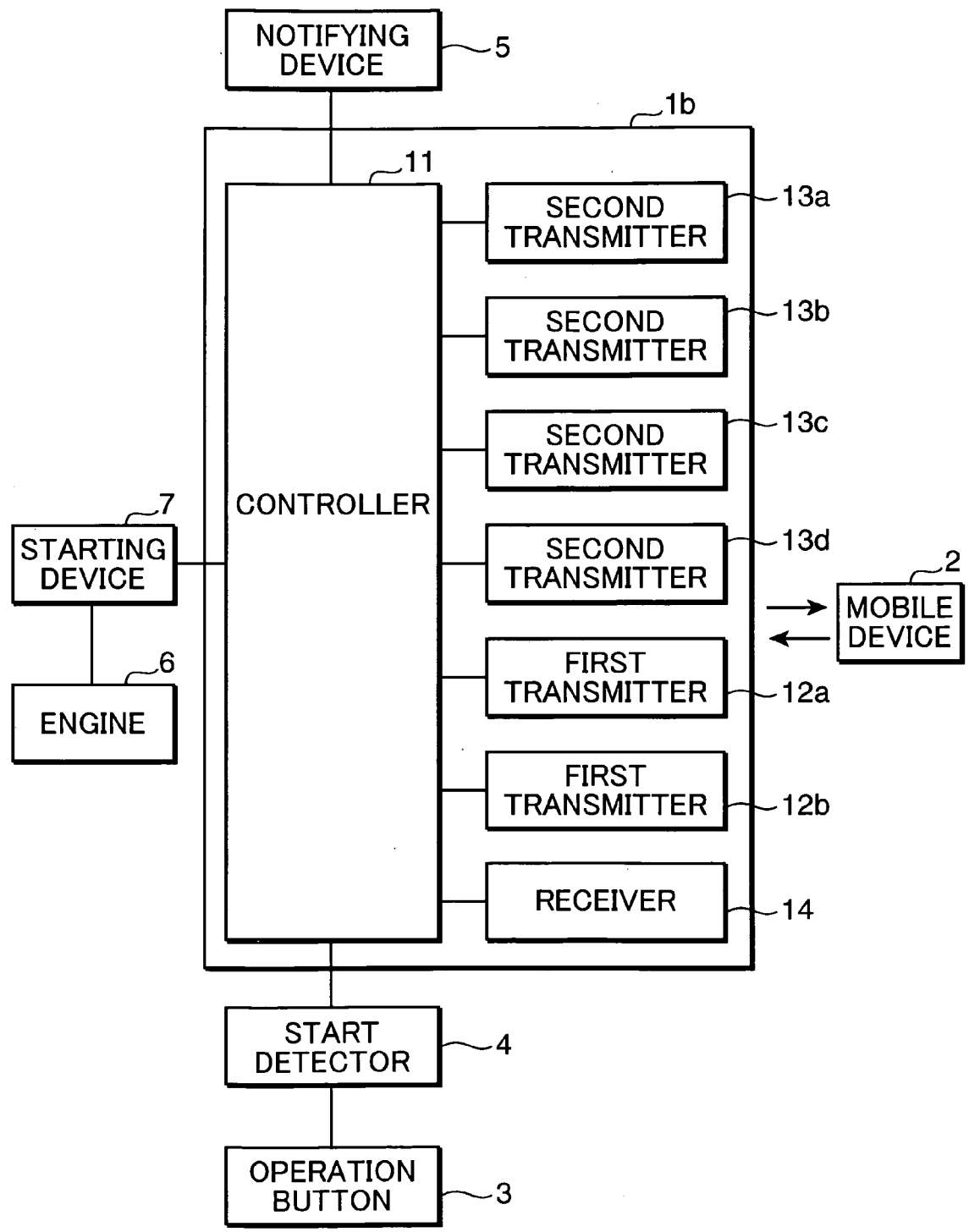
FIG. 7 is a block diagram showing a construction of a vehicle communication system according to a third embodiment of the invention.

FIG. 7 is a block diagram showing a construction of a vehicle communication system according to a third embodiment of the present invention. The vehicle communication system shown in FIG. 7 differs from the one shown in FIG. 1 in that the first transmitter 12 is replaced by two first transmitters 12a, 12b. Since the other points are as in the vehicle communication system shown in FIG. 1, only differences are described in detail below by identifying the identical elements by the same reference numerals.

The vehicle communication system shown in FIG. 7 is provided with a transceiver 1b and a mobile device 2, wherein the transceiver 1b includes a controller 11, the two first transmitters 12a, 12b, second transmitters 13a to 13d and a receiver 14. The transceiver 1b is connected with a start detector 4, a notifying device 5, and a starting device 7.

Each first transmitter 12a, 12b includes an oscillating circuit and an antenna and is disposed at a specified position in a passenger compartment. For example, the first transmitter 12a is disposed below or above a position between a driver's seat 32 and a front passenger seat 33, whereas the first transmitter 12b is disposed below or above the center of a rear passenger seat 34. The first transmitters 12a, 12b are so controlled by the controller 11 as to transmit request signals requesting an authentication code signal if the start detector 4 detects the pressing of an operation button 3. The controller 11 is connected with the start detector 4, the notifying device 5, the starting device 7, the first transmitters 12a, 12b, the second transmitters 13a to 13d and the receiver 14 to control operations of the respective devices.

Figure 8:
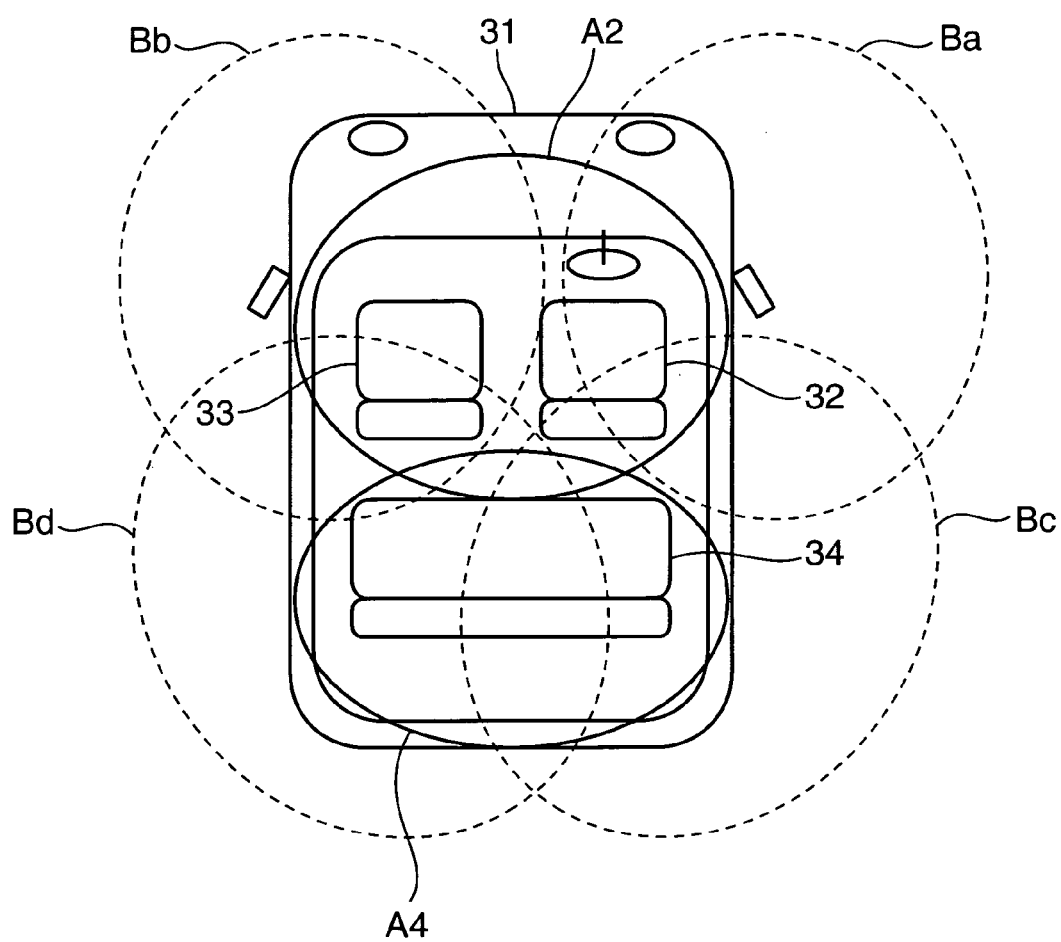
FIG. 8 is a diagram showing an example of communication areas of request signals transmitted from first transmitters and second transmitters shown in FIG. 7.
Figure 9:
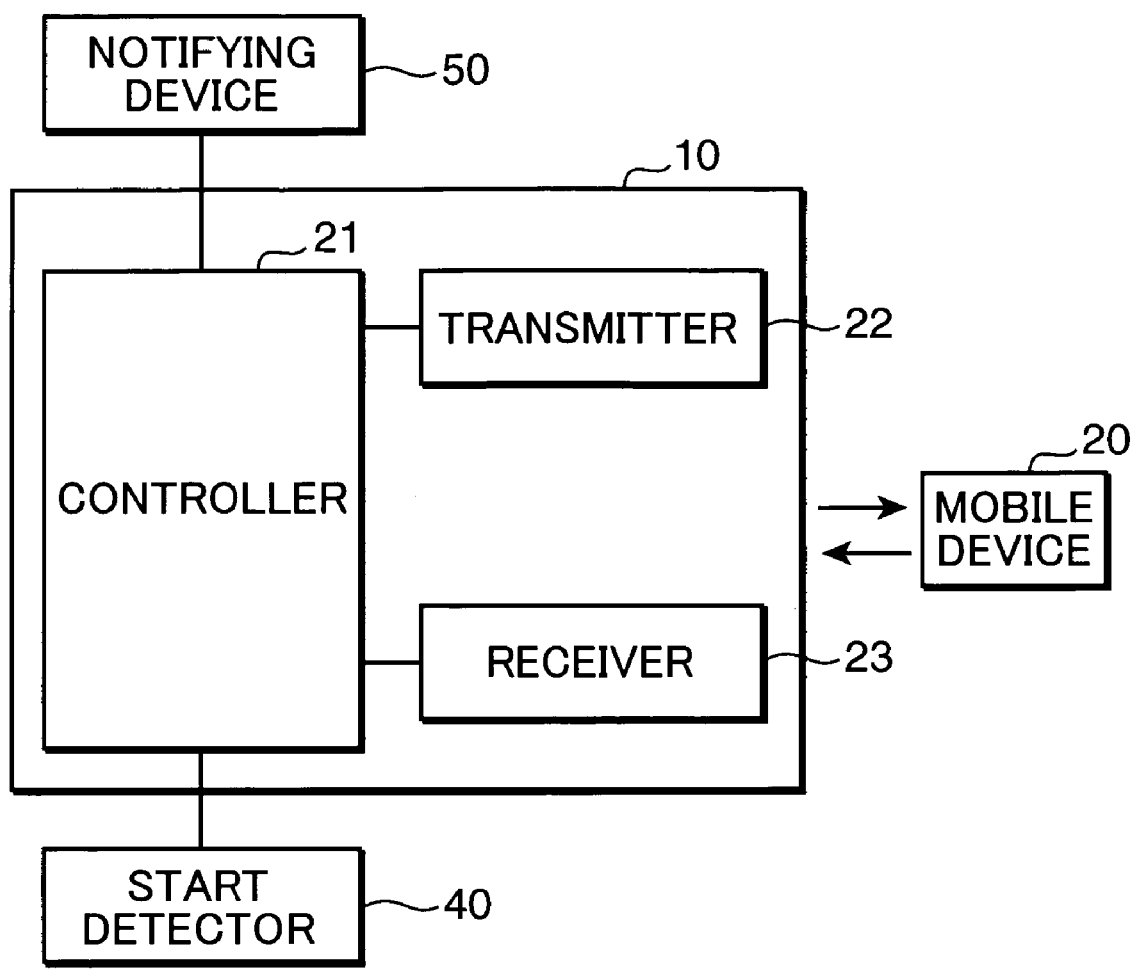
FIG. 9 is a block diagram showing a construction of a prior art vehicle communication system.

FIG. 8 is a diagram showing an example of communication areas of request signals transmitted from the first and second transmitters shown in FIG. 7. An area A2 shown by solid line in FIG. 8 is a communication area of the request signal from the first transmitter 12a and covers the driver's seat, the front passenger seat 33 and their neighborhoods in the passenger compartment, whereas an area A4 shown also by solid line in FIG. 8 is a communication area of the request signal of the first transmitter 12b and covers the rear passenger seat 34 and its neighborhood in the passenger compartment.

By the above construction, when a driver presses the operation button 3 to start the engine 6, the start detector 4 detects this engine starting action and outputs a detection result to the controller 11. The controller 11 detects the detection of the engine starting action by the start detector 4 and causes the first transmitter 12a to send the request signal requesting the authentication code signal.

Thereafter, the controller 11 confirms a received content of the receiver 14, and judges that the mobile device 2 is located in the communication area A2 (driver's seat 32, front passenger seat 33 and their neighborhoods in the passenger compartment) of the first transmitter 12a, i.e. the driver is carrying the mobile device 2 if the receiver 14 has received the authentication code signal from the mobile device 2. In such a case, the controller 11 causes the notifying device 5 to output information representing that the driver is carrying the mobile device 2 and causes the starting device 7 to start the engine 6. The notifying device 5 notifies this information to the driver and/or the passenger, for example, by outputting a short beeping sound indicating this information.

On the other hand, the controller 11 causes the first transmitter 12b to transmit the request signal if the receiver 14 has received no authentication code signal from the mobile device 2. Thereafter, if the mobile device 2 transmitted the authentication code signal in response to the request signal transmitted from the first transmitter 12b and the receiver 14 received the authentication code signal, the controller 11 judges that the mobile device 2 is located in the communication area A4 of the first transmitter 12b (rear passenger seat 34 and its neighborhood in the passenger compartment), i.e. the driver is carrying the mobile device 2 and subsequently operates in the same manner as above. The succeeding operations of the second transmitter 13a to 13d are same as in the first embodiment.

Accordingly, this embodiment can obtain the same effects as the first embodiment and the engine 6 can be started even if the driver leaves the mobile device 2 near the rear passenger seat.

This application is based on Japanese patent application serial No. 2003-433146, filed in Japan Patent Office on Dec. 26, 2003, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle communication system provided with a transceiver disposed in a vehicle and a mobile device for transmitting and receiving specified signals to and from the vehicle equipped with the transceiver, wherein the transceiver includes:
   a first transmitting means for outputting a first request signal toward a first communication area, the first request signal requesting a response from the mobile device;
   a second transmitting means for outputting a second request signal toward a second communication area different from the first communication area,
   a receiving means for receiving a response signal transmitted from the mobile device in response to the first request signal or the second request signal; and
   a control means for controlling operations of the first transmitting means, the second transmitting means and the receiving means;

wherein the mobile device transmits the response signal to the receiving means in the case of receiving the first request signal transmitted from the first transmitting means or the second request signal transmitted from the second transmitting means; and wherein the control means:
   detects a position of the mobile device based on a communication result between the mobile device and the receiving means in response to the first and second request signals transmitted from the first and second transmitting means;
   controls a notifying means for outputting information used to specify the position of the mobile device to a user based on a detection result of the position of the mobile device;
   judges that the mobile device is located in the first communication area and causes the notifying means to output information representing that the mobile device is located in the first communication area if the receiving means has received the response signal from the mobile device in response to the first request signal transmitted from the first transmitting means;

judges that the mobile device is located in the second communication area excluding the first communication area and causes the notifying means to output information representing that the mobile device is located in the second communication area excluding the first communication area if the receiving means has received no response signal from the mobile device in response to the first request signal transmitted from the first transmitting means, but has received the response signal from the mobile device in response to the second request signal transmitted from the second transmitting means; and judges that the mobile device is located outside the first and second communication areas and causes the notifying means to output information representing that the mobile device is located outside the first and second communication areas if the receiving means has received no response signal from the mobile device in response to the first and second request signals transmitted from the first and second transmitting means.

2. A vehicle communication system according to claim 1, wherein:

the first transmitting means outputs the first request signal toward a driver's-seat centered communication area covering a driver's seat and its neighborhood;

the second transmitting means outputs the second request signal toward an extended communication area wider than the driver's-seat centered communication area; and the control means:

judges that the mobile device is located at the driver's seat or its neighborhood and causes the notifying means to output information representing that the mobile device is located at the driver's seat or its neighborhood if the receiving means has received the response signal from the mobile device in response to the first request signal transmitted from the first transmitting means;

judges that the mobile device is located in the extended communication area excluding the driver's seat and its neighborhood and causes the notifying means to output information representing that the mobile device is located in the extended communication area excluding the driver's seat and its neighborhood if the receiving means has received no response signal from the mobile device in response to the first request signal transmitted from the first transmitting means, but has received the response signal from the mobile device in response to the second request signal transmitted from the second transmitting means; and judges that the mobile device is located outside the extended communication area and causes the notifying means to output information representing that the mobile device is located outside the extended communication area if the receiving means has received no response signal from the mobile device in response to the first and second request signals transmitted from the first and second transmitting means.

3. A vehicle communication system according to claim 2, wherein:

the extended communication area includes a within-compartment communication area at least covering the entire area in a passenger compartment excluding the driver's-seat centered communication area; and the control means:

judges that the mobile device is located at the driver's seat or its neighborhood and causes the notifying means to output information representing that the mobile device is located at the driver's seat or its neighborhood if the receiving means has received the response signal from the mobile device in response to the first request signal transmitted from the first transmitting means;

judges that the mobile device is located in the passenger compartment excluding the driver's seat and its neighborhood and causes the notifying means to output information representing that the mobile device is located in the passenger compartment excluding the driver's seat and its neighborhood if the receiving means has received no response signal from the mobile device in response to the first request signal transmitted from the first transmitting means, but has received the response signal from the mobile device in response to the second request signal transmitted from the second transmitting means; and judges that the mobile device is located outside the passenger compartment and causes the notifying means to output information representing that the mobile device is located outside the passenger compartment if the receiving means has received no response signal from the mobile device in response to the first and second request signals transmitted from the first and second transmitting means.

4. A vehicle communication system according to claim 2, wherein:

the extended communication area includes a within-vehicle communication area at least covering the entire area within the vehicle excluding the driver's-seat centered communication area; and the control means:

judges that the mobile device is located at the driver's seat or its neighborhood and causes the notifying means to output information representing that the mobile device is located at the driver's seat or its neighborhood if the receiving means has received the response signal from the mobile device in response to the first request signal transmitted from the first transmitting means;

judges that the mobile device is located within the vehicle excluding the driver's seat and its neighborhood and causes the notifying means to output information representing that the mobile device is located within the vehicle excluding the driver's seat and its neighborhood if the receiving means has received no response signal from the mobile device in response to the first request signal transmitted from the first transmitting means, but has received the response signal from the mobile device in response to the second request signal transmitted from the second transmitting means; and judges that the mobile device is located outside the vehicle and causes the notifying means to output information representing that the mobile device is located outside the vehicle if the receiving means has received no response signal from the mobile device in response to the first and second request signals transmitted from the first and second transmitting means.

5. A vehicle communication system according to claim 2, wherein:
the second request signal includes a front right second request signal, a front left second request signal, a rear right second request signal, and a rear left second request signal;
the second transmitting means includes:
a front right transmitting means disposed at a front right side of the vehicle for outputting the front right second request signal toward a front right area of the vehicle;
a front left transmitting means disposed at a front left side of the vehicle for outputting the front left second request signal toward a front left area of the vehicle;
a rear right transmitting means disposed at a rear right side of the vehicle for outputting the rear right second request signal toward a rear right area of the vehicle; and
a rear left transmitting means disposed at a rear left side of the vehicle for outputting the rear left second request signal toward a rear left area of the vehicle;
wherein the front right area, the front left area, the rear right area and the rear left area cover at least the entire area within the vehicle excluding the driver's-seat centered communication area; and
the control means:
judges that the mobile device is located at the driver's seat or its neighborhood and causes the notifying means to output information representing that the mobile device is located at the driver's seat or its neighborhood if the receiving means has received the response signal from the mobile device in response to the first request signal transmitted from the first transmitting means;
judges that the mobile device is located within the vehicle excluding the driver's seat and its neighborhood and causes the notifying means to output information representing that the mobile device is located within the vehicle excluding the driver's seat and its neighborhood if the receiving means has received no response signal from the mobile device in response to the first request signal transmitted from the first transmitting means, but has received the response signal from the mobile device in response to at least one of the front right second request signal transmitted from the front right transmitting means, the front left second request signal transmitted from the front left transmitting means, the rear right second request signal transmitted from the rear right transmitting means and the rear left second request signal transmitted from the rear left transmitting means; and
judges that the mobile device is located outside the vehicle and causes the notifying means to output information representing that the mobile device is located outside the vehicle if the receiving means has received no response signal from the mobile device in response to the first request signal transmitted from the first transmitting means, the front right second request signal transmitted from the front right transmitting means, the front left second request signal transmitted from the front left transmitting means, the rear right second request signal transmitted from the rear right transmitting means and the rear left second request signal transmitted from the rear left transmitting means.

6. A vehicle communication system according to claim 1, wherein:
the first transmitting means outputs the first request signal toward a within-compartment front communication area covering the driver's seat, the front passenger seat and their neighborhoods;
the second transmitting means transmits the second request signal toward a communication extended area wider than the within-compartment front communication area; and
the control means:
judges that the mobile device is located at the driver's seat, the front passenger seat or their neighborhoods and causes the notifying means to output information representing that the mobile device is located at the driver's seat, the front passenger seat or their neighborhoods if the receiving means has received the response signal from the mobile device in response to the first request signal transmitted from the first transmitting means;
judges that the mobile device is located in the extended communication area excluding the driver's seat, the front passenger seat and their neighborhoods and causes the notifying means to output information representing that the mobile device is located in the extended communication area excluding the driver's seat, the front passenger seat, and their neighborhoods if the receiving means has received no response signal from the mobile device in response to the first request signal transmitted from the first transmitting means, but has received the response signal from the mobile device in response to the second request signal transmitted from the second transmitting means; and
judges that the mobile device is located outside the extended communication area and causes the notifying means to output information representing that the mobile device is located outside the extended communication area if the receiving means has received no response signal from the mobile device in response to the first and second request signals transmitted from the first and second transmitting means.

7. A vehicle communication system according to claim 1, wherein:
the first transmitting means outputs the first request signal toward a within-compartment communication area covering the entire area in the passenger compartment;
the second transmitting means outputs the second request signal toward an extended communication area wider than the within-compartment communication area; and
the control means:
judges that the mobile device is located in the passenger compartment and causes the notifying means to output information representing that the mobile device is located in the passenger compartment if the receiving means has received the response signal from the mobile device in response to the first request signal transmitted from the first transmitting means;
judges that the mobile device is located in the extended communication area excluding the interior of the passenger compartment and causes the notifying means to output information representing that the mobile device is located in the extended communication area excluding the interior of the passenger compartment if the receiving means has received no response signal from the mobile device in response to the first request signal transmitted from the first transmitting means, but has received the response signal from the mobile device in response to the second request signal transmitted from the second transmitting means; and judges that the mobile device is located outside the extended communication area and causes the notifying means to output information representing that the mobile device is located outside the extended communication area if the receiving means has received no response signal from the mobile device in response to the first and second request signals transmitted from the first and second transmitting means.

8. A vehicle communication system according to claim 1, wherein:

the first request signal includes a within-compartment front first request signal and a within-compartment rear first request signal;

the first transmitting means includes a within-compartment front transmitting means for outputting the within-compartment front first request signal toward a within-compartment front communication area covering the driver's seat, the front passenger seat and their neighborhoods, and a within-compartment rear transmitting means for outputting the within-compartment rear first request signal toward a within-compartment rear communication area covering the rear passenger seat and its neighborhood, the second transmitting means outputs the second request signal toward an extended communication area wider than the within-compartment front communication area; and the control means:

judges that the mobile device is located at the driver's seat, the front passenger seat or their neighborhoods and causes the notifying means to output information representing that the mobile device is located at the driver's seat, the front passenger seat or their neighborhoods if the receiving means has received the response signal from the mobile device in response to the within-compartment front first request signal transmitted from the within-compartment front transmitting means; and judges that the mobile device is located at the rear passenger seat or its neighborhood and causes the notifying means to output information representing that the mobile device is located at the rear passenger seat or its neighborhood if the receiving means has received no response signal from the mobile device in response to the within-compartment front first request signal transmitted from the within-compartment front transmitting means, but has received the response signal from the mobile device in response to the within-compartment rear first request signal transmitted from the within-compartment rear transmitting means.

9. A vehicle communication system provided with a transceiver disposed in a vehicle and a mobile device for transmitting and receiving specified signals to and from the vehicle equipped with the transceiver, wherein the transceiver includes:

a first transmitting means for outputting a first request signal toward a first communication area the first request signal requesting a response from the mobile device;

a second transmitting means for outputting a second request signal toward a second communication area different from the first communication area, a receiving means for receiving a response signal transmitted from the mobile device in response to the first request signal or the second request signal; and a control means for controlling operations of the first transmitting means, the second transmitting means and the receiving means;

wherein the mobile device transmits the response signal to the receiving means in the case of receiving the first request signal transmitted from the first transmitting means or the second request signal transmitted from the second transmitting means; and wherein the control means:

detects a position of the mobile device based on a communication result between the mobile device and the receiving means in response to the first and second request signals transmitted from the first and second transmitting means;

controls a start detecting means for detecting that a user has instructed to start an engine of the vehicle and a starting means for starting the engine;

controls the first transmitting means to output the first request signal toward the first communication area if the start detecting means detects that the user has instructed to start the engine of the vehicle; and controls the starting means to start the engine of the vehicle if the receiving means receives the response signal from the mobile device in response to the first request signal transmitted from the first transmitting means while controlling the starting means not to start the engine of the vehicle unless the receiving means receives the response signal from the mobile device in response to the first request signal transmitted from the first transmitting means.

10. A vehicle communication system provided with a transceiver disposed in a vehicle and a mobile device for transmitting and receiving specified signals to and from the vehicle equipped with the transceiver, wherein the transceiver includes:

a first transmitting means for outputting a first request signal toward a first communication area, the first request signal requesting a response from the mobile device;

a second transmitting means for outputting a second request signal toward a second communication area different from the first communication area, a receiving means for receiving a response signal transmitted from the mobile device in response to the first request signal or the second request signal; and a control means for controlling operations of the first transmitting means, the second transmitting means and the receiving means;

wherein the mobile device transmits the response signal to the receiving means in the case of receiving the first request signal transmitted from the first transmitting means or the second request signal transmitted from the second transmitting means; and wherein the control means:

detects a position of the mobile device based on a communication result between the mobile device and the receiving means in response to the first and second request signals transmitted from the first and second transmitting means;

controls a locking/unlocking detecting means for detecting that a user has instructed to lock or unlock doors of the vehicles and a locking/unlocking means for locking or unlocking the doors of the vehicle;

controls the first transmitting means to output the first request signal toward the first communication area if the locking/unlocking detecting means detects that the user has instructed to lock or unlock the doors of the vehicle;

controls the locking/unlocking means not to lock or unlock the doors of the vehicle if the receiving means has received the response signal from the mobile device in response to the first request signal transmitted from the first transmitting means; and controls the locking/unlocking means to lock or unlock the doors of the vehicles if the receiving means has received no response signal from the mobile device in response to the first request signal transmitted from the first transmitting means, but has received the response signal from the mobile device in response to the second request signal transmitted from the second transmitting means.

* * * * *